No. 613,097. Patented Oct. 25, 1898.
C. W. VOSPER.
DRIVING GEAR FOR VELOCIPEDES.
(Application filed Dec. 15, 1897.)

(No Model.) 2 Sheets—Sheet 1.

No. 613,097. Patented Oct. 25, 1898.
C. W. VOSPER.
DRIVING GEAR FOR VELOCIPEDES.
(Application filed Dec. 15, 1897.)

(No Model.) 2 Sheets—Sheet 2.

UNITED STATES PATENT OFFICE.

CHARLES WALTER VOSPER, OF BARNSTAPLE, ENGLAND, ASSIGNOR TO PATRICK JOSEPH LIDDELL, OF EXETER, ENGLAND.

DRIVING-GEAR FOR VELOCIPEDES.

SPECIFICATION forming part of Letters Patent No. 613,097, dated October 25, 1898.

Application filed December 15, 1897. Serial No. 662,071. (No model.)

*To all whom it may concern:*

Be it known that I, CHARLES WALTER VOSPER, engineer, a subject of the Queen of Great Britain, residing at Barnstaple, in the county of Devon, England, have invented certain new and useful Improvements in Driving-Gear for Velocipedes and other Vehicles, of which the following is a specification, reference being had to the accompanying drawings, in which—

Figure 1:
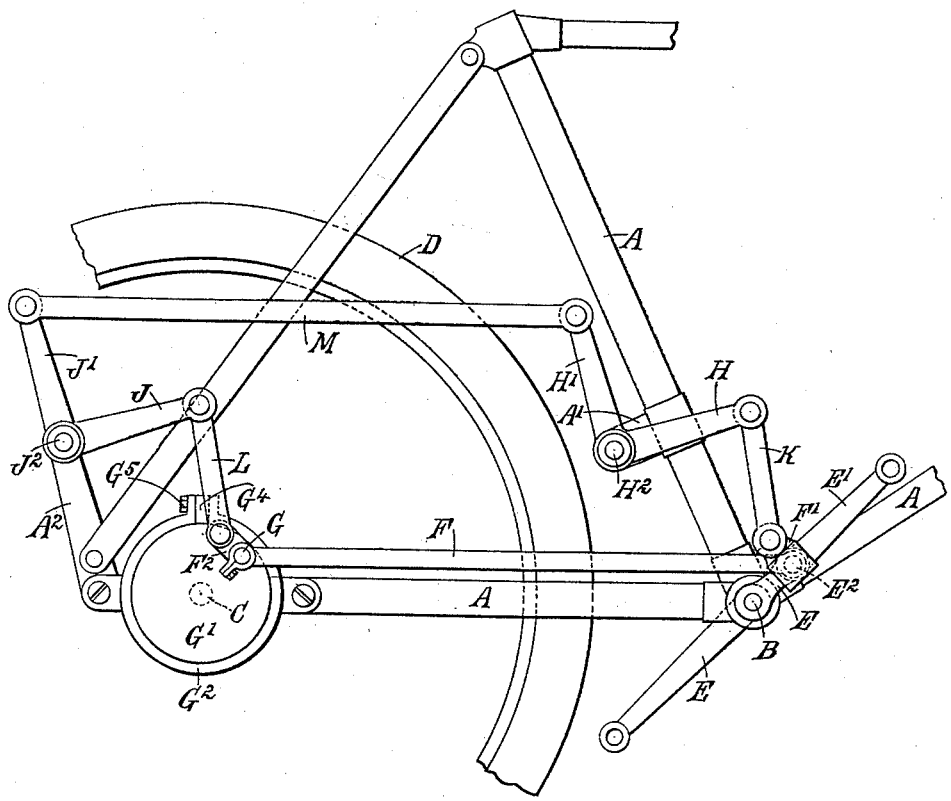
Figure 2:
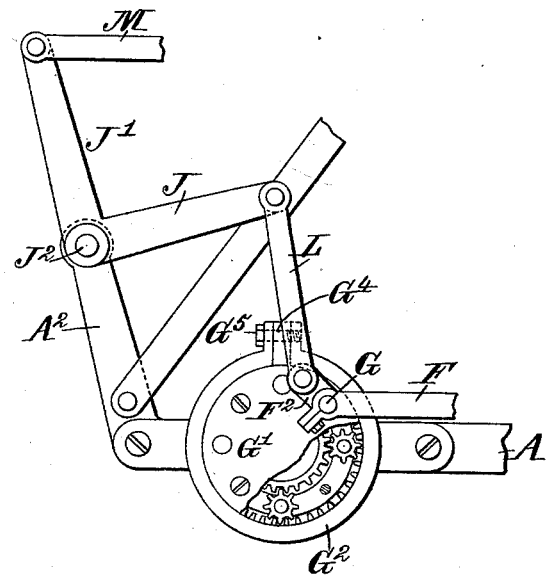
Figure 3:
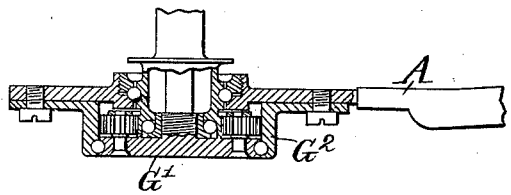

Figure 1 is a side elevation of part of a velocipede having my improved driving-gear applied thereto. Fig. 2 is a like view of certain of the parts shown in Fig. 1, the crank-disk being shown broken away to disclose the multiplying-gearing; and Fig. 3 is a horizontal section through this gearing.

My invention relates to an improved driving-gear for velocipedes and other vehicles which enables motion to be communicated from the pedal crank-shaft to the driving-wheel or wheels without necessitating the employment of a chain and is at the same time very efficient in operation.

My said invention consists partly in the combination of a pedal crank-shaft provided with a double crank—that is to say, a crank having an additional crank-pin—which is advantageously arranged between the two parts of a divided pedal-crank and is connected at its rear or other end by means of a connecting rod or link to a crank-pin of similar throw attached to suitable multiplying-gear acting on the driving-wheel of the velocipede. The means which I employ for carrying the crank-pin to which the rear end of the said connecting rod or link is connected over its dead-centers forms an important feature of my said invention, and comprises two bell-crank levers, each arranged in a similar position relatively to one of the said cranks or to the opposite ends of the said connecting rod or link and having their corresponding arms coupled by means of links to the said cranks or preferably to the respective ends of the connecting rod or link above mentioned, the other arms of the said bell-crank levers being connected together by means of a second connecting rod or link.

My said invention, moreover, comprises other improvements hereinafter set forth.

Referring to the drawings, A is the frame of the velocipede; B, the pedal crank-shaft; C, the axle (or hub) of the rear or driving wheel D, and E E are the pedal-cranks.

One of the pedal-cranks is divided into two parts E E', which are rigidly connected together by means of a crank-pin $E^2$. This crank-pin is coupled, by means of a connecting-rod F, to the pin G of a crank disk, ring, or carrier G', turning in a suitable ball or other bearing $G^2$ in the frame A and connected to the driving wheel (or wheels) D through suitable multiplying-gear—such, for example, as an internally-toothed wheel bearing the crank-pin G and geared with a pinion on the hub or axle of the rear or driving wheel or gearing of the kind known as the "Crypto" gear.

In order to insure the carrying of the crank-pin G over its dead-points, I provide a system of linkwork comprising two similar bell-crank levers H H' and J J', pivoted at $H^2$ $J^2$ to brackets A' $A^2$ on the frame A of the machine. The arm H of the bell-crank lever H H' is coupled, by means of a link K, to a lug F' on the upper side of the connecting-rod F at or near the pedal-crank end thereof, while the arm J of the bell-crank lever J J' is coupled, by means of a link L, to a lug $F^2$ at the driving-wheel end of the connecting-rod F, the other corresponding arms H' J' of the said bell-crank levers being coupled together by means of a link M.

By connecting the links K L to lugs F' $F^2$ on the connecting-rod F, I am enabled to obviate the necessity for lengthening the crank-pin $E^2$, and thus prevent widening of the "tread" of the machine. The said links may, however, if desired, be connected directly to the crank-pins $E^2$ G.

It will be seen that when the connecting-rod F lies along the line joining the centers of the shaft B and the crank disk, ring, or carrier G' and the crank-pin G is thus on one or other of its dead-points the system of linkwork will be in the most advantageous position for driving the said crank disk or carrier G', and, conversely, when the links K L are on their dead-points the connecting-rod F will be in the most advantageous position for driving the said crank disk or carrier.

The crank-disk bearing comprises a ring $G^2$ the internal diameter of which is but slightly greater than the external diameter of the disk, ring, or carrier $G'$, the internal surface of the ring $G^2$ and the periphery of the disk $G'$ being formed with suitably-prepared ball races or channels for receiving balls of hardened steel or other suitable material. These balls are introduced through a space which is normally closed by means of a removable plug or piece $G^4$, secured in position by means of a bolt $G^5$.

What I claim is—

1. In a velocipede or similar vehicle, the combination, with the driving-crank and the driving-wheel, of a driven crank, gearing connecting said driven crank with said wheel, a connecting-rod coupling said cranks, bell-crank levers pivoted to the frame of the machine, a connecting-rod coupling together said bell-crank levers, and links coupling said bell-crank levers respectively to said cranks, substantially as, and for the purposes, above specified.

2. In a velocipede, the combination of a pedal-crank comprising two parts connected by a supplementary crank-pin or driving-wheel, a disk-crank, gearing connecting said disk-crank with said driving-wheel, a connecting-rod coupling said supplementary crank-pin to the pin of said disk-crank, bell-crank levers pivoted to the frame of the machine, a connecting-rod coupling together said bell-crank levers, and links coupling said bell-crank levers to said supplementary crank and said disk-crank respectively, substantially as, and for the purposes, above specified.

CHARLES WALTER VOSPER.

Witnesses:
DAVID YOUNG,
HENRY W. LYNDEN.